United States Patent Office 3,454,406
Patented July 8, 1969

3,454,406
PROCESS FOR STERILIZING FOODS AND OTHER MATERIALS
Gordon Alderton, Orinda, Calif., assignor to the United States of America as represented by the Secretary of Agriculture
No Drawing. Continuation-in-part of application Ser. No. 340,571, Jan. 27, 1964. This application Apr. 14, 1967, Ser. No. 630,813
Int. Cl. A23l *3/34;* A23b *7/14*
U.S. Cl. 99—215                                    10 Claims

ABSTRACT OF THE DISCLOSURE

Process for sterilizing foods and other materials, particularly those subject to microbial spoilage, which utilizes the discoveries that (a) bacterial spores exhibit ion-exchange properties, that (b) in the acid (hydrogen) form the spores are more easily destroyed by heat than when in the salt form, e.g., in the Na or Ca form, and that (c) the ion exchange takes place at a relatively slow rate, particularly at room temperature or below, so that if the spores in hydrogen form are exposed to a medium of increased pH their thermal sensitivity will presist, permitting their easy destruction even in such medium. Typically, the sterilization is carried out as follows: (1) The pH of the food is reduced by adding an acid—e.g., HCl—and the acidified food is allowed to stand to effectuate the formation of the hydrogen form of spores adventitiously present in the food. (2) The treated food is partially neutralized with sodium bicarbonate under conditions to retain $CO_2$ in the food, sealed in a container, and (3) then subjected to heating to destroy the spores (and, of course, vegetative forms of microorganisms).

---

This application is a continuation-in-part of my copending application Ser. No. 340,571, filed Jan. 27, 1964, now Patent 3,328,178, granted June 27, 1967.

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for sterilizing materials, including processes for preserving substances such as foodstuffs which are normally subject to microbial spoilage. Further objects of the invention will be evident from the following description wherein parts and percentages are by weight unless otherwise specified.

The most common method of sterilizing involves subjecting the material in question to heat. Such technique is applied in many fields, for example, in preserving food products, in packaging drugs and surgical equipment, etc. Although the procedure is widely used, it is subject to certain disadvantages. A particular problem is that the degree of heating required to destroy the infesting microbial life, especially spores, often causes undesirable changes in the intrinsic properties of the substances in question. Depending on the composition of the substances being subjected to the heat sterilization, such deleterious changes may occur as for example: denaturation of proteins; degradation of starch or other high polymers into smaller fragments; hydrolysis of ester, peptide, and other structures susceptible to hydrolysis; decomposition of labile compounds such as vitamins, flavor component, etc. The problems which are encountered are particularly demonstrated by reference to canning of foods.

The common canning method of preserving perishable foods involves placing the food in a sealed container—usually a can—and then subjecting the container and its contents to heat for an extended period of time. This method is effective and universally used but has the disadvantage that the combination of temperature and heating time adequate to destroy the microbial population of the foodstuff is deleterious to the foodstuff itself, because some forms of microbial life, particularly bacterial spores, are very resistant to heat. Modern processors use temperatures well above 212° F. and long periods of heating (as high as 60 to 200 minutes, or more) to insure adequate destruction of spores. For example, an authoritative canner's association recommends the following minimum heating times for processing vegetables in No. 2 cans at 240° F., namely; green beans, 20 min.; carrots, 30 min.; peas, 35 min.; corn, 50 min. As a result of such drastic heat treatment, the color, flavor, and textures of the product are necessarily adversely affected. Thus the majority of conventional canned foods are inferior in color, texture, and flavor to the fresh-cooked products. Another undesirable feature of the widely used canning process is the fact that live spores of thermophilic bacteria remain in the heat-processed product. If the product is then accidentally or, as in food vending machines, purposely held at thermophilic temperatures (50–80° C.), troublesome spoilage results from the germination and growth of these thermophiles. In general, considerations of product heat stability do not permit sufficiently severe heat processing to kill these thermophilic spores.

In my prior application Ser. No. 340,571, I have disclosed a novel sterilization process which obviates the problems outlined above. A particular advantage of the process is that sterilization is obtained by a relatively mild heat treatment whereby the possibility of hydrolysis or other deleterious changes taking place is substantially diminished or eliminated completely.

Basically, the process of Ser. No. 340,571 involves these steps:

(1) The material in question is treated with an acid.
(2) The acid-treated material is restored to its original pH, as by neutralization with a base.
(3) The material is then subjected to a heat sterilization treatment.

The significance of these steps and their relation to certain principles not heretofore known are explained as follows:

My investigations on bacterial spores led to a finding that these spores exhibit cationic exchange properties analogous, for example, to those displayed by cation exchange resins of the polymethacrylic acid type. For example, by holding the spores in aqueous acid they will absorb the acid; that is, they will change to the hydrogen (acid) form. If then they are contacted with a cation such as $Ca^{++}$ or $Na^+$, particularly when applied at a neutral to alkaline pH, they will absorb the metal ions, i.e., the spores will change to the calcium or sodium salt forms, respectively. Moreover, I have found that the state of the spores, i.e., whether they are in the hydrogen form or in the salt form, makes a profound difference in their thermal sensitivity. Thus in general, the spores in the acid form display a low resitance to heat whereas in the salt form the spores display a high resistance to heat. Expressed another way, if the same heating conditions as to time and temperature are applied to both forms, many more of the spores in the acid form will be killed than those in the salt form.

In the first step of the procedure of Ser. No. 340,571, advantage is taken of the principle explained above. Thus, by the acid treatment the microbial spores adventitiously present on the substance being treated are put into a condition of reduced thermal resistance. In other words, they are sensitized to heat so that in a later stage of the process they can be destroyed by the application of less heat than that which would be required in the absence of the acid treatment.

In the second step of the procedure of Ser. No. 340,571, the acid-treated material is neutralized with a base to restore it to its original pH. The significance of this step is that thereby the material is restored to its original condition or character. For example, in the case of a food the product then will have the same pH as it did originally and hence its original flavor will be restored. An important point about this neutralization step is that it does not vitiate the effect of the prior acid treatment—the spores are not converted into a salt form wherein they would have high thermal resistance. This is a key concept of the process of Ser. No. 340,571: Unexpectedly, I found that the thermal sensitivity imparted to the spores persist even though the environment about the spores has been changed, i.e., is no longer acid. Although bacterial spores exhibit cation exchange ability, considerable time is involved for such exchange and this time is lengthened with decreasing temperature. Thus when the material is neutralized, the process of sorbing metal ions will be initiated but at such a rate that the material can readily be handled further without loss of the advantage of the acid treatment. This persistence of the acid-induced thermal sensitivity permits one to attain sterility in a subsequent heating operation (Step 3) by the application of a relatively mild heat treatment and in an environment less acid than that used to induce the heat sensitivity.

In accordance with the present invention, the process of Ser. No. 340,571 is employed with certain modifications, whereby to attain superior results. In particular, the modified procedure enables one to attain sterility with a heat treatment which is even milder than that afforded by the aforesaid prior procedure. A critical item in the procedure of the present invention is that after completion of the acid treatment, the material is not restored to its original pH; but is neutralized to a limited extent such that its pH is left slightly more acidic than it was originally. In particular, this is accomplished by retaining $CO_2$ in the material, typically by alkalizing with a carbonate under conditions where $CO_2$ remains dissolved in the material, or at least, the aqueous part thereof. During the subsequent heat treatment, loss of this $CO_2$ is prevented by sealing the material in a container prior to application of heat. Several important advantages flow from this modified procedure.

The main advantage is that the heating program required to sterilize the product is less severe—as to tempertaure, time, or both—than required in my prior method. Indeed, I have found that the rate of destruction of spores is approximately twice that obtained in my prior method. Moreover, because of this multiplying effect when the instant technique is used in conjunction with the acid treatment of my prior invention, I attain a rate of destruction of spores from 10 to 20 times higher than attained with conventional techniques—i.e., application of heat without treatment of the material.

The effectiveness of the present technique is believed to involve a better maintenance of the heat sensitivity of the spores developed during the acid treatment. Thus when the material is brought to its original pH level, a certain amount of heat sensitivity will be lost during the initiation of heating—some of the spores will be converted from the hydrogen (heat sensitive) form to the salt (heat resistant) form. However, when the material is left even slightly more acidic—as done in my new procedure—the possibility of such deleterious action is reduced. (It has been explained hereinabove that acidic conditions favor the formation of the hydrogen form of the spores, and neutral to alkaline conditions favor formation of the salt form of the spores.)

It is recognized that it is generally known in the art that an acid condition during heat sterilization is beneficial as decreasing the thermal resistance of spores. Thus, at an acid pH, the spores are killed by a lesser degree of heating than would otherwise be the case. This phenomenon has been advantageously applied in canning foods. For example, an edible acid such as acetic acid is added to vegetable products, typically artichoke hearts, when they are canned so that sterility may be attained with a lesser degree of heating than would be the case with the vegetable at its natural pH. This ancient technique, however, has no real bearing on my novel procedure. For one thing, there has been no prior recognition that spores exhibit ion exchange properties, nor that these properties can be utilized to alter the heat resistance of the spores. Also, although acid conditions have been heretofore applied, they have never been applied in a system where the material has been previously treated to render the spores thermo-sensitive and the acidic conditions are applied to retain this previously developed thermal sensitivity. It is to be emphasized that the process of the invention utilizes a small degree of acidity—at most, one pH unit and usually a fraction of a pH unit. It could not have been foretold that such a slight degree of acidity would cause the substantial increase in rate of spore destruction described above. Moreover, because of the small degree of acidity involved, no problems are encountered with can corrosion nor is there any deterioration of the food under treatment. A further point is that with conventional acid canning processes, the acidification is permanent. The product is more acidic than normal, hence has a sour taste. As a matter of fact, the ancient procedure noted above can be employed only with those foods—e.g., artichoke hearts—where a sour taste can be tolerated. On the other hand, the acidity in the process of the invention is only temporary. Since it is caused by the presence of $CO_2$, it is evident that when the canned product is opened and warmed in normal manner for consumption, the $CO_2$ will be quickly driven off and the pH of the product will increase to its original level, i.e., the original flavor of the product will be restored.

The practice of the present invention is explained in more detail as follows:

STEP 1.—ACID STRIPPING

The material to be treated is subjected to the same first step as used in the technique of Ser. No. 340,571, namely: The material is contacted with an acid. The nature of the acid is not significant since its only function is to supply hydrogen ions. Obviously, where food materials are being handled, one would select a non-toxic acid. Typical acids which may be employed are for example nitric, hydrochloric, sulphuric, phosphoric, hydrobromic, trichloroacetic, acetic, chloroacetic, fumaric, maleic, salicyclic, tartaric, etc. Acid salts such as sodium bisulfate may also be used. Hydrochloric acid is generally preferred as on addition of sodium bicarbonate or other sodium-containing alkalizer (in the second step) there is formed ordinary salt—a common ingredient of foods. The acid is applied in aqueous solution and at a concentration to provide an acidic pH. Low pH's are desirable to expedite the treatment and generally a pH of about 1.5 to 5 is preferred. The formation of the hydrogen form of the spores—or, stripping as it is termed herein—takes place relatively slowly and sufficient time must be allowed for the desorption of metal ions naturally present on the spores. This rate is further dependent on temperature so that, for example, whereas extensive stripping will be obtained in about 1 to 5 hours at 50° C., the same degree of stripping at 25° C will require anywhere from 1 to 10 days. Also, the concentration and valence of metal cations which are present in the material are factors influencing the rate of stripping. For example, polyvalent metal cations such as Ca and Mg take a longer time and/or a lower pH to strip than monovalent cations such as Na and K. A higher concentration of metal cations will also require a longer time of stripping. In any particular case, thermal death trials may be run from time to time during the acid stripping operation to determine when an effective decrease in heat resistance has been achieved. Taking into account the various factors mentioned above, the acid stripping is continued for a period long enough to obtain such a degree of stripping that the thermal resistance of the spores is markedly decreased, this time being anywhere from a few minutes to 10 days, depending on the circumstances. The acid stripping may be conducted at room temperature (25° C.) or above. Since the rate of stripping increases with increasing temperature, it is preferred to use as high a temperature short of damaging the material being treated. It is to be noted that the process of the invention does not depend on any ability of the acid per se to destroy microbial forms. Thus the acid treatment by itself exhibits little if any ability to destroy spores on contact. The function of the acid is to put the spores into a condition wherein their thermal resistance is lowered. However, it is obvious that if the acid stripping is conducted at a high enough temperature there will be spore destruction at this stage. Such spore destruction is, however, merely an incident to the main function of the acid treatment as described above and the process of the invention is operative whether the acid treatment is conducted at lethal or sub-lethal temperatures.

STEP 2.—LIMITED NEUTRALIZATION

This step is different from that of the prior application and involves the modification which yields the enhanced results.

In the process of Ser. No. 340,571, the material—after it has been contacted with acid to obtain the desired stripping effect—is treated with a base such as sodium hydroxide or sodium carbonate to restore it to its original pH. In accordance with the present invention, only a limited neutralization is employed: The neutralization is conducted in such a way that the material is left slightly more acidic than it was originally. Moreover, the agent used for the neutralization is selected so that the acidity involved is due to the presence of $CO_2$. Alternatively, $CO_2$ can be added directly. The procedure can best be explained by reference to an illustrative example:

The material under treatment is, say, a pureed food having an original pH of 6. In the acid stripping procedure (step 1), the pH of the puree is reduced to about 3. After the acid stripping step is completed, a small aliquot of the acidified puree is titrated against a standard solution of sodium hydroxide to determine the amount of NaOH which would be required to restore the main batch of acidified puree to its original pH of 6. Let it be assumed that this figure turns out to be 80 grams of NaOH. This figure is then used to calculate the chemically equivalent amount of sodium bicarbonate. This, of course, is $$80 \times \frac{84 \text{ (M.W. of NaHCO}_3)}{40 \text{ (M.W. of NaOH)}}$$

or 168 grams of $NaHCO_3$. Accordingly, this amount of sodium bicarbonate—preferably dissolved in enough water to put it into solution—is incorporated into the main batch of acidified puree. Naturally, the pH of the puree will not be 6, but slightly less because of the carbon dioxide remaining dissolved therein. The neutralization is usually carried out at room temperature and even if part of the $CO_2$ escapes as gas, a considerable portion will remain dissolved. The particular pH of the treated material will depend on various factors including the type and amount of buffering substances (fruit acids, proteins, salts, etc.) present in the material, the temperature at which the neutralization is conducted, the solubility of $CO_2$ in the substrate in question, etc. In general, I have observed that the pH of the partially neutralized material may be anywhere from 0.1 to 1.0 pH unit less than the original value, and have obtained good results over this range.

It is, of course, obvious that the partial or limited neutralization need not necessarily be performed with the aid of the titration method described above. Thus for example, a pH about 1/10 to 1 unit less than that of the original material may be selected and the alkalizing agent added in small quantities to acidified material until the selected pH is reached. It is also evident that sodium bicarbonate need not necessarily be used—although it is preferred. One can use other carbonates, for example, sodium carbonate, potassium carbonate, or potassium bicarbonate. Moreover, instead of employing a carbonate as the alkalizer one may neutralize the acid-treated material to its original pH with a base—e.g., sodium hydroxide or potassium hydroxide, or a basic salt such as disodium phosphate—and then develop the desired slight acidification by bubbling $CO_2$ into the neutralized material until it is substantially saturated with $CO_2$. Alternatively, the $CO_2$ may be added by dropping small pieces of solid $CO_2$ (Dry Ice) into the material and quickly sealing the product into a container. Another plan is to incorporate $CO_2$ under pressure. This can be accomplished, for example, in conventional can-filling and sealing equipment. It is further evident that combinations of any of the above-described modes of adding $CO_2$ may be employed. For example, the limited neutralization may be done with sodium bicarbonate and additional $CO_2$ may be incorporated in a subsequent step when the material is filled into a container and sealed therein.

Regardless of the particular technique used in the limited neutralization, it is evident that it is desired to retain $CO_2$ in the material. To this end the step is conducted at ordinary (room) temperature, or even at lower temperatures since the solubility of $CO_2$ in water increases with decreasing temperature. Thus for example, one may apply cooling to any temperature short of one which would freeze the material or make it so thick as to impede proper incorporation of the alkalizer (or impede incorporation of $CO_2$ if this technique is employed).

After the material has been subjected to the modified or limited neutralization as above described, it is sealed into an appropriate container, for example, a conventional can, jar, or an autoclave. Since it is desired to retain the $CO_2$ which provides the slight acidity, the sealing is done without delay, and, if desired, additional $CO_2$ is added as the material is being sealed into the container. If any delay is necessary, the material may be cooled to prevent, or at least minimize, loss of $CO_2$. Any such loss can, of course, be made up by adding $CO_2$ just prior to sealing.

Having sealed the material in a container, it is then ready for treatment by the next step—the heat treatment. The primary point of sealing the material in a container is to ensure retention of $CO_2$ (hence retention of the desired slight acidity) during the heat treatment step. Of course, other benefits which are incidental to the invention are achieved by the sealing, e.g., one prevents reinfection of the final sterilized product by microbial forms present in the environment.

STEP 3.—HEAT TREATMENT

The material sealed in the container is subjected to a heat treatment—for example, in a conventional canning retort, autoclave, or the like—in order to destroy the spores which are now in an especially thermolabile condition (plus, of course, to destroy whatever vegetative microbial forms are present on the material). The important point of this heat treatment is that the severity thereof (as to time, temperature, or both) will not only be less than that required in conventional sterilization procedures but also be less than that required in the procedure of Ser. No. 340,571.

The general considerations to be observed are:

The temperature and time for heating the material will vary, depending on such factors as the effectiveness of heat transfer attained, the nature and previous history of the material, the types of microorganism with which it is infected, and the amount of adventitious microflora. For example, in the preservation of foods in accordance with the invention such items as low pH of the food and good sanitary condition of the food make for a lesser degree of heat treatment. Also as in conventional canning, one must take into account the size of the container since with larger containers one must allow more time for penetration of heat into the interior than with a smaller container. In any event, the degree of heat processing will be substantially less than with conventional sterilization. Also, by rendering the spores especially sensitive to heat, as hereinabove described, the temperature or heating time or both will be substantially less than with my prior process. In any particular case the minimum heat processing treatment can be ascertained by running the usual pilot experiments in which containers of the material to be preserved are subjected to varying conditions of temperature and time followed by microbiological examinations to determine the minimum heating levels required to ensure production of a sterile product. Since the temperature and heating time are influenced by so many factors, it is impossible to set forth any numerical limits on these conditions. The heating conditions can best be described as heating at a temperature and for a time sufficient to render the material essentially sterile, the combination of temperature and time of heating required to achieve this end being substantially less than would be required to attain sterility in the absence of the acid treatment, and also less than would be required to attained sterility by using the acid treatment in conjunction with neutralization to original pH.

The process of invention is of wide versatility and can be applied to materials of every type. A typical application of the invention is in the preservation of foodstuffs, for example, fruits, vegetables, milk, eggs, meat, spices, fish, cereal products, cheeses, and so forth. Liquid foods such as juices, purees, concentrates, sauces, soups, extracts, and beverages of every type are included.

Although the invention is particularly adapted for the preservation of foods, it may also be applied for the preservation of any substance which is normally susceptible to microbial spoilage. Thus for example, the invention may be applied for the preservation of such substances as animal glues and mucilages; dextrins; starch pastes and solutions; cosmetic, medicinal, and dental preparations; vitamin preparations; pastes, solutions, or other preparations of natural gums such as tragacanth, arabic, acacic karaya, locust bean, agar-agar, pectin, algin, etc.; fermentation broths, mashes, and residues from fermentation processes; whey, wines; animal feeds and ingredients of animal feeds such as fish meals, blood meals, feather meal, meat scraps, bone meal, tankage, grains, and oil-seed meals; proteins and protein hydrolysates; textile printing pastes; paints containing protein or other spoilable dispersing agents; solutions of bark extracts or other tanning agents; mollasses; by-products or wastes that contain potentially valuable carbohydrate, proteinous or fat ingredients such as stick liquor, corn steep liquor, fruit cannery wastes, citrus peels, cull fruit and vegetables, tops of root vegetables, distillers' slops, pulp liquors, wash water from textile desizing operations, waste liquors from wool scouring plants, dairy and slaughter house wastes and liquors, etc.

The invention may be also applied to materials such as bandages, sutures, needles and surgical devices and instruments of all types; implements used in microbiological and pharmacological investigations, for example, culture media, test tubes, petri dishes, animal cages, etc. In applying the invention to needles, petri dishes, surgical instruments or other solid materials which have relatively impervious surfaces, the following technique is generally preferred. The material, after application of the first (acid treatment) step, is washed (preferably with sterile water) to remove residual acid. Then the moist material is placed in a container with added carbon dioxide, the container is sealed, and subjected to the heat treatment (step 3).

EXAMPLES

The invention is further demonstrated by the following examples. In these examples, the material being treated was deliberately inoculated with certain microorganisms. This was done to demonstrate the efficacy of the treatment. It is obvious that in a practice of the invention for practical purposes, the material would not be so inoculated. Also, in all the examples the conditions of stripping were deliberately chosen to be mild enough so that no significant spore killing took place during the acid treatment. This was done so that inoculum levels (number of live spores) in each treatment would be the same. This was required with these comparative experiments because the time to heat sterilize depends on the *number* of spores. Obviously in a practice of the invention under circumstances where no comparison with controls is involved, it would not be necessary to restrict the conditions of stripping to such levels.

Example 1

A series of runs were carried out to compare the efficacy of (A) the process of the invention with (B) the process of Ser. No. 340,571, and—as a control—with (C) heating without any treatment of the material. The runs were applied to various pureed baby foods. With each food product, the following procedure was applied:

(A) Treatment in accordance with the invention: The food was inoculated with spores of *Bacillus stearothermophilus* to provide a concentration of 100,000,000 spores per ml. The inoculated food was acidified to a pH of 2.9–3.0 by addition of HCl, and held at 70° C. for one hour to effect the acid-stripping. The acid-treated food was then neutralized to its original pH by addition of the required amount of 1 N sodium hydroxide solution. Carbon dioxide gas was then bubbled into the neutralized material, cooled in an ice bath, until it was saturated therewith (about 3 minutes was required). One-half ml. portions of the resulting material were sealed into thermal death time tubes and these were heated for various times in an oil bath maintained at 115.6° C. After the heat treatment, the tubes were cooled quickly and each was plated on agar (Tryptone, 1%; glucose, 0.5%; soluble starch, 0.1%), and incubated for 2 days at 53° C. The colonies were then counted to ascertain a typical survivor curve from which was read the heating time providing a 100,000-fold reduction of survivors, that is, reduced the bacterial count from 100,000,000 per ml. to 1000 per ml.

(B) Process of Ser. No. 340,571: The procedure as described above in part A was used with this exception. The step of adding $CO_2$ was omitted—the neutralized food was directly subjected to the heating process.

(C) Control: In this series the food was inoculated as set forth in part A and the inoculated food was directly subjected to the heating process described in part A.

The results obtained are tabulated below:

TABLE I

[Heating at 115.6° C.]

| Run | Product | Treatment<br>A=This invention<br>B=S.N. 340,571<br>C=Control | pH [1] | Heating time for 100,000× reduction of survivors, min. | Relative efficiency [2] | |
|---|---|---|---|---|---|---|
| | | | | | A and B compared to the control C | A compared to B |
| 1 | Beef liver | A | 5.55 | 1.5 | 20 | 2.3 |
| 2 | do | B | 5.85 | 3.5 | 8.5 | 1 |
| 3 | do | C | 5.85 | 30 | 1 | |
| 4 | Creamed spinach | A | 5.35 | 4 | 11 | 2.5 |
| 5 | do | B | 6.05 | 10 | 4.3 | 1 |
| 6 | do | C | 6.05 | 43 | 1 | |
| 7 | Beef | A | 5.55 | 5.5 | 6.2 | 1.55 |
| 8 | do | B | 6.0 | 8.5 | 4.0 | 1 |
| 9 | do | C | 6.0 | 34 | 1 | |
| 10 | Chicken | A | [3] n.d. | 4.0 | 7.7 | 1.65 |
| 11 | do | B | 6.0 | 6.6 | 4.7 | 1 |
| 12 | do | C | 6.0 | 31 | 1 | |
| 13 | Peas | A | 5.3 | 3.7 | 10.5 | 2.3 |
| 14 | do | B | 6.05 | 8.5 | 4.5 | 1 |
| 15 | do | C | 6.05 | 38.5 | 1 | |

[1] pH of food, measured at room temperature, just before insertion into thermal death time tubes.
[2] The relative efficiency, compared to the control C, was obtained by dividing the time required for 100,000-fold reduction of the control sample by the times required for samples of treatment A and B, respectively. The relative efficiency, compared to treatment B, was obtained by dividing the time required for 100,000-fold reduction of the sample of treatment B by the time required for the sample of treatment A.
[3] "n.d."=not determined.

Example 2

The procedure as described in Example 1 was repeated, except that in this case the heating was at 112.5° C. The results are tabulated below:

TABLE II

[Heating at 112.5° C.]

| Run | Product | Treatment<br>A=This invention<br>B=S.N. 340,571<br>C=Control | pH [1] | Heating time for 100,000× reduction of survivors, min. | Relative efficiency [2] | |
|---|---|---|---|---|---|---|
| | | | | | compared to the control C | compared to treatment B |
| 1 | Sweet potato | A | 5.1 | 5.5 | 9.8 | 1.4 |
| 2 | do | B | 5.4 | 7.5 | 7.2 | 1 |
| 3 | do | C | 5.4 | 54 | 1 | |
| 4 | Beef liver | A | 5.5 | 5 | 11.4 | 1.6 |
| 5 | do | B | 5.95 | 8 | 7.1 | 1 |
| 6 | do | C | 5.95 | 57 | 1 | |
| 7 | Carrots | A | 4.9 | 2.5 | 13.2 | 1.8 |
| 8 | do | B | 5.1 | 4.5 | 7.3 | 1 |
| 9 | do | C | 5.1 | 33 | 1 | |
| 10 | Squash | A | 4.95 | 4 | 10.5 | 1.75 |
| 11 | do | B | 5.2 | 7 | 6.0 | 1 |
| 12 | do | C | 5.2 | 42 | 1 | |
| 13 | Mixed vegetables | A | 5.0 | 4 | 8.5 | 1.5 |
| 14 | do | B | 5.3 | 6 | 5.7 | 1 |
| 15 | do | C | 5.3 | 34 | 1 | |

[1] pH of food, measured at room temperature, just before insertion into thermal death time tubes.
[2] The relative efficiency, compared to the control C, was obtained by dividing the time required for 100,000-fold reduction of the control sample by the times required for samples of treatment A and B, respectively. The relative efficiency, compared to treatment B, was obtained by dividing the time required for 100,000-fold reduction of the sample of treatment A.

Having thus described the invention, what is claimed is:

1. A method for sterilizing a material contaminated with microbial spores which comprises:
  (a) contacting the material with an acid in a concentration insufficient per se to cause any substantial direct destruction of the spores,
  (b) maintaining the material in contact with said acid for a period sufficient to obtain stripping of metal ions from the spores whereby to cause a substantial reduction in the thermal resistance of the spores,
  (c) restoring the pH of the acid-treated material to a level which is slightly less than its original pH, by adding a $CO_2$ alkalizer while retaining $CO_2$ in the material,
  (d) sealing the material into a container, and
  (e) subjecting the material within the container to heat at a temperature and for a time sufficient to produce an essentially sterile product, the combination of temperature and time of heating being substantially less than would be required to attain sterility in the absence of said acid treatment, and also being substantially less than would be required to attain sterility in the absence of said retention of slight acidity.

2. A process for preserving a material normally subject to microbial spoilage which comprises:
  (a) contacting the material with an acid in a concentration insufficient per se to cause any substantial direct destruction of contaminating spores and insufficient to cause any material damage to the material,
  (b) maintaining the material in contact with said acid for a period sufficient to obtain stripping of metal ions from the contaminating spores whereby to cause a substantial reduction in the thermal resistance of the spores,
  (c) partially neutralizing the acid-treated material to bring its pH to a level which is slightly less than its original pH, by adding a $CO_2$ alkalizer while retaining $CO_2$ in the material,
  (d) sealing the material into a container, and
  (e) subjecting the material within the container to heat at a temperature and for a time sufficient to produce an essentially sterile product, the combination of temperature and time of heating being substantially less than would be required to attain sterility in the absence of said acid treatment, and also substantially less than would be required to attain sterility in the absence of said retention of slight acidity.

3. The process of claim 2 wherein the said material is a food.

4. The process of claim 2 wherein the partial neutralization (c) is carried out by incorporating an alkali metal carbonate with the acid-treated material, the amount of said alkali metal carbonate being so limited that the resulting material has a pH about 0.1 to 1 unit less than its original pH.

5. The process of claim 4 wherein the alkali metal carbonate is sodium bicarbonate.

6. The process of claim 2 wherein the partial neutralization (c) is carried out by first neutralizing the acid-treated material to its original pH with an alkali metal hydroxide and then slightly acidifying the neutralized material by saturating it with $CO_2$.

7. The proecss of claim 2 wherein the partial neutralization (c) is carried out by incorporating sodium bicarbonate into the acid-treated material, and wherein additional $CO_2$ is added just prior to the sealing step (d).

8. A method for reducing the severity of heat treatment required to preserve a material against microbial spoilage which comprises applying to the material, prior to subjecting it to heat treatment, the following treatment:
 (a) contacting the material with acid at a concentration insufficient per se to cause any direct destruction of contaminating spores and insufficient to damage the material,
 (b) continuing said contact for a time sufficient to render the contaminating spores sensitive to heat,
 (c) partially neutralizing the acid-treated material to bring its pH to a level which is about 0.1 to 1 pH unit less than its original pH, by adding a $CO_2$ alkalizer while retaining $CO_2$ in the material, and thereafter
 (d) applying said heat treatment to the material while preventing loss of $CO_2$.

9. A method for sterilizing a material contaminated with microbial spores which comprises:
 (a) contacting the material with acid under conditions insufficient to cause any direct destruction of the spores and insufficient to damage the material but sufficient to encourage stripping of metal ions from the spores whereby to reduce their thermal resistance,
 (b) maintaining the material in contact with the acid for a period sufficient to obtain a substantial reduction in thermal resistance of the spores,
 (c) partially neutralizing the acid-treated material with a $CO_2$-containing alkalizer while retaining $CO_2$ in the material and using the said alkalizer in an amount to bring the pH of the material to a level about 0.1 to 1 pH unit less than its original value, and
 (d) subjecting the material, while preventing loss of $CO_2$, to heat at a temperature and for a time sufficient to produce an essentially sterile product, the combination of temperature and time of heating being substantially less than would be required to attain sterility in the absence of said acid treatment, and also being less than would be required to attain sterility in the absence of said retention of $CO_2$.

10. The method of claim 9 wherein the material is a food, the acid is hydrochloric acid, and the $CO_2$-containing alkalizer is sodium bicarbonate.

References Cited

UNITED STATES PATENTS

| | | | |
|---|---|---|---|
| 2,434,388 | 6/1936 | Brehm | 99—154 |
| 3,328,178 | 6/1967 | Alderton | 99—215 |

OTHER REFERENCES

Cruess: Commercial Fruit and Vegetable Products, New York, McGraw-Hill, 1948, pp. 126–129.

ALVIN E. TANENHOLTZ, *Primary Examiner.*

P. B. ANDEWELT, *Assistant Examiner.*

U.S. Cl. X.R.

21—58; 99—150, 154